(12) United States Patent
Grupp

(10) Patent No.: US 7,610,162 B2
(45) Date of Patent: Oct. 27, 2009

(54) METHOD AND MACHINE FOR DETERMINING A SPACE COORDINATE OF A MEASUREMENT POINT ON A MEASUREMENT OBJECT

(75) Inventor: Guenter Grupp, Boehmenkirch (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 11/827,064

(22) Filed: Jul. 10, 2007

(65) Prior Publication Data

US 2008/0033680 A1 Feb. 7, 2008

Related U.S. Application Data

(63) Continuation of application No. PCT/EP2006/000065, filed on Jan. 5, 2006.

(30) Foreign Application Priority Data

Jan. 18, 2005 (DE) ........................ 10 2005 003 321

(51) Int. Cl.
G01B 5/004 (2006.01)
(52) U.S. Cl. .................. 702/95; 700/60; 33/503
(58) Field of Classification Search .......... 702/86, 702/94–95, 150, 155, 158; 700/56–61, 63–64; 33/1 M, 503–504, 556, 559
See application file for complete search history.

(56) References Cited

U.S. PATENT DOCUMENTS

| 3,749,501 | A | | 7/1973 | Wieg |
| 4,523,380 | A | | 6/1985 | Wright |
| 4,587,622 | A | | 5/1986 | Herzog |
| 4,676,649 | A | | 6/1987 | Phillips |
| 4,749,876 | A | * | 6/1988 | Gale et al. .................. 327/109 |
| 5,333,386 | A | | 8/1994 | Breyer et al. |
| 5,355,705 | A | * | 10/1994 | Schulze et al. ................. 72/83 |
| 6,484,818 | B2 | * | 11/2002 | Alft et al. ..................... 175/45 |
| 6,906,276 | B2 | * | 6/2005 | Kaeseler et al. .......... 219/86.41 |
| 2005/0102118 | A1 | | 5/2005 | Grupp et al. |
| 2008/0033690 | A1 | * | 2/2008 | Grupp ........................ 702/152 |

FOREIGN PATENT DOCUMENTS

| DE | 38 26 783 | C1 | 12/1989 |
| EP | 0 309 094 | | 3/1989 |

* cited by examiner

Primary Examiner—Eliseo Ramos Feliciano
Assistant Examiner—Mary C Baran
(74) Attorney, Agent, or Firm—Harness, Dickey & Pierce, P.L.C.

(57) ABSTRACT

A measurement point is approached with a probe head arranged on a displacement mechanism having at least two supports. An actual difference value between the displacement positions of a first and a second support is determined. A static difference value representing is provided and subtracted from the actual difference, in order to obtain a dynamic difference value representing a static difference between the first and the second displacement positions is subtracted from the actual difference value in order to obtain a dynamic difference value. The space coordinate of the measurement point is determined as a function of the dynamic difference value.

15 Claims, 5 Drawing Sheets

METHOD AND MACHINE FOR DETERMINING A SPACE COORDINATE OF A MEASUREMENT POINT ON A MEASUREMENT OBJECT

CROSS REFERENCES TO RELATED APPLICATIONS

This application is a continuation of international patent application PCT/EP2006/000065, filed on Jan. 5, 2006 designating the U.S., which international patent application has been published in German language as WO 2006/077018 A1 and claims priority from German patent application DE 10 2005 003 321.0, filed on Jan. 18, 2005. The entire contents of these priority applications are incorporated herein by reference.

BACKGROUND OF THE INVENTION

The present invention relates to a method and a machine for determining at least one space coordinate of a measurement point on a measurement object. More particularly, the invention relates to a method and a machine involving a first and a second movable support for carrying and moving a probe head, wherein the first and second movable supports may have slightly different positions along the axis of movement of the probe head.

Generally, the space (or spatial) coordinates of a measurement point on an object can be determined by approaching the measurement point with a movable probe head of a coordinate measuring machine. In the case of tactile coordinate measuring machines, the measurement point is touched with a touch element (in general a touch pin or stylus). The position of the probe head and, optionally, a deflection of the touch element relative to the probe head allow to determine the desired space coordinates of the measurement point. Similar considerations apply to coordinate measuring instruments with optical or other non-contact probe heads. As will be readily appreciated, the measurement accuracy of the coordinate measuring machine strongly depends on how accurately the respective position of the probe head can be determined when approaching the measurement point.

Measurement errors may result from inaccuracies and/or modifications of the position measuring instruments for the probe head. For example, glass measuring scales are often used as measuring instruments, which are read incrementally when moving the probe head in order to determine the respective travel position of the probe head in space. The glass measuring scales may expand or contract as a function of the temperature.

Another cause of error is due to manufacturing tolerances in the guides of the coordinate measuring machine, i.e. some sort of "waviness" or other deviations from an exactly straight guide path of the probe head in the intended movement direction.

A third cause of errors may be due to elastic deformations of the coordinate measuring machine, as a function of the gravitational moment which the probe head exerts in its respective travel position on the displacement mechanism.

Finally, measurement errors may result from position deviations of the probe head, which arise because of and/or during the travel movements. These include for example oscillations which may be caused by starting and braking the probe head. For coordinate measuring machines in portal or gantry design (i.e. coordinate measuring machines having a movable bridge on two separate supports movable parallel to one another), measurement errors may for example result from movements along the movement axis of the bridge (typically the Y axis), and specifically when there is a lack of synchronicity in the travel movement of the two supports. For example, if the left-hand support is moved further in the Y axis by a distance $\Delta Y$ than the right-hand support, then this leads to a rotation of the probe head about an orthogonal axis (typically the Z axis). This in turn leads to measurement errors both in the Y direction and in a second orthogonal direction (typically the X axis). In this context, however, it should be emphasized that the invention is not restricted to measurement errors in these special axes. Rather, the invention may be used for all coordinate measuring machines in which a displacement position of the probe head along at least one axis is determined by means of two mutually separated measuring instruments for this one axis.

It has been known for a long time to correct temperature-induced measurement errors by correcting the measurement values derived from the measuring instruments as a function of the respective ambient temperature. For example, the temperature-dependent length changes of glass measuring scales can be corrected by means of thermal expansion coefficients. It is also known to correct geometrical guide errors and elastic deformations by means of correction values which are recorded by a calibration run of the probe head for various probe head positions, and are provided in a memory. Such correction methods are often referred to as CAA (computer aided accuracy) in the specialist terminology, and the Assignee of the present invention offers a program named LASERCAL for recording calibration data and for appropriately correcting measurement deviations.

DE 102 14 490 A1, for instance, discloses a method for correcting elastic guide errors in a horizontal-arm coordinate measuring machine.

The known methods, however, are not capable of correcting measurement errors, which are the result of irreproducible variations in the measurement operation, with the desired accuracy. These errors include inter alia rotary measurement errors of coordinate measuring machines in portal or gantry design as a result of oscillations and/or due to lack of synchronicity in movements along the Y axis.

DE 22 48 194 B2 proposes to record the respective displacement positions of the portal feet of a coordinate measuring machine in portal design by two separate measuring instruments. A difference value is formed from the measurement values obtained. This difference value is subsequently used for correcting the measurement value delivered by one of the measuring instruments. No distinction is made between whether the difference value was caused by reproducible or irreproducible variations.

Another method of this kind is known from EP 0 309 094 A1. In this case as well, no distinction is made between reproducible (for example due to geometry) and irreproducible (dynamically caused) deviations and resulting measurement errors.

DE 29 50 926 A1 discloses a coordinate measuring machine in which three measuring instruments, spatially separated from one another, are used for each movement axis in order to correct measurement errors. Difference formation is employed for the correction in this case as well, but without distinguishing between measurement errors of different causes.

Finally, EP 0 537 641 B1 proposes to correct the measurement errors of a coordinate measuring machine in portal design during a travel movement along the Y axis, by recording the deviations in the position measurement values of two separate measuring instruments during a time period before the sampling, and by determining a correction value for the position of the sampling element at the sampling time from the time profile of the stored measurement values. It is thereby possible to correct dynamic measurement errors due to oscillations. This method, however, is restricted to the use of switching probe heads. In this form, it cannot be used with measuring probe heads.

Even though the last mentioned methods already provide higher measurement accuracies with coordinate measuring machines in portal or gantry design than without computational correction, the measurement accuracy is not yet optimal.

SUMMARY OF THE INVENTION

It is therefore desirable, and, accordingly, it is an object of the present invention to provide a method for determining space coordinates of a measuring point on a measurement object with an increased accuracy in those cases, where two or more mutually separated measuring instruments for one axis are used.

It is another object of the invention to provide such a method which can be implemented in a simple and cost-effective manner, even on older existing coordinate measuring machines.

It is also an object of the invention to provide a coordinate measuring machine having two or more mutually separated measuring instruments for one axis, which permits higher measurement accuracies than older existing machines.

According to a first aspect, there is provided a method for determining at least one space coordinate of a measurement point on a measurement object, comprising the steps of approaching the measuring point with a probe head arranged on a displacement mechanism which comprises a first and a second movable support, determining a first displacement position of the first support and determining a second displacement position of the second support, determining an actual difference value between the first and the second displacement positions, providing a static difference value which represents a static difference between the first and the second displacement positions, subtracting the static difference value from the actual difference in order to obtain a dynamic difference value, and determining the space coordinate of the measurement point as a function of the dynamic difference value.

According to another aspect, there is provided a coordinate measuring machine for determining at least one space coordinate of a measurement point on a measurement object, comprising a displacement mechanism having a first and a second movable support, a probe head arranged on the displacement mechanism for approaching the measuring point, a first and a second measuring instrument for determining a first displacement position of the first support and a second displacement position of the second support, an actual difference formation unit for determining an actual difference value between the first and second displacement positions, a memory for permanently storing and providing a static difference value representing a static difference between the first and second displacement positions, and a calculation unit for determining the space coordinate of the measurement point, the calculation unit comprising a subtractor for subtracting the static difference value from the actual difference value in order to obtain a dynamic difference value, and configured to determine the space coordinate as a function of the dynamic difference value.

According to yet another aspect, there is provided computer program product comprising program code configured for carrying out a method, when executed on a processor of a coordinate measuring machine, comprising the following steps: approaching the measuring point with a probe head arranged on a displacement mechanism which comprises a first and a second movable support, determining a first displacement position of the first support and determining a second displacement position of the second support, determining an actual difference value between the first and the second displacement positions, receiving a static difference value which represents a static difference between the first and the second displacement positions, subtracting the static difference value from the actual difference value in order to obtain a dynamic difference value, and determining the space coordinate of the measurement point as a function of the dynamic difference value.

The new method and machine and the new program are thus based on the idea of dividing the actual difference between the measurement values of the two measuring instruments into a first (static) difference value and a second (dynamic) difference value. Since the first, static difference value is provided permanently in a memory of the coordinate measuring machine, it represents a component of the actual difference which is the same for a multiplicity of measurements. It thus represents reproducible measurement errors. In contrast thereto, the second, dynamic difference value represents a component of the actual difference which describes variations of the actual difference value from the static difference value (component). In other words, the second, dynamic difference value is a quantity which varies individually from one measurement to the next and is not identically reproducible.

Splitting the respective current actual difference into a static component, assumed to be reproducible, and a dynamic component, assumed to be irreproducible, makes it possible to correct the current measurement values expediently as a function of the various error causes. In other words, the present invention for the first time provides a method and a corresponding coordinate measuring machine with which superimposed error causes are individually taken into account, and in which the correction of the measurement errors is carried out in a way which is tailored to the individual causes. More accurate correction of the various measurement errors is therefore possible.

In other words, the new method allows more accurate measurement values than the previously known approaches. In particular, the present invention avoids correcting dynamically induced (irreproducible) measurement errors too strongly, i.e. by the static or reproducible component filtered out according to the invention. On the other hand, the present invention makes it possible to carry out the static difference value component by using known and established correction tools, for example the aforementioned LASERCAL program. Practical implementation of the present invention is therefore very simple and cost-effective, and above all can be retrofitted with little outlay even in older coordinate measuring machines already in use.

In one configuration of the invention, the space coordinate determined by using the dynamic difference value is subsequently corrected by using the static difference value.

In this configuration, a correction of the position values obtained by the measuring instruments is thus first carried out by means of the dynamic difference value, and only then is the position value, already corrected once, corrected again by using the static difference value. As an alternative to this, it would in principle also be conceivable to carry out the various correction steps in a different sequence, or even to carry out only one of said corrections. With the present configuration, however, the space coordinate of the measurement point is exactly determined, especially when the second correction is carried out by means of known and well-established CAA tools, which in many cases are designed for correcting static guide errors.

In another configuration, the supports are moved substantially parallel in a first space direction when approaching the measurement point and the probe head is furthermore moved in a second space direction transverse to the first space direction, when approaching the measurement point, wherein the space coordinate is determined both in the first space direction and in the second space direction by using the dynamic difference value.

In this configuration, not only the space coordinate lying parallel to the movement direction of the portal feet is corrected in accordance with the invention, but also a correction of the measurement values is carried out in a second space direction transverse thereto (usually the X coordinate). The measurement accuracy is therefore even higher.

In another configuration, the static difference value is determined by means of a calibration run, which is preferably carried out along the movement axis of the portal, and subsequently provided permanently in a memory.

As an alternative to this, it would basically be possible to determine the static difference value in a different way, for example from parameter data of the coordinate measuring machine. Carrying out a calibration run, however, takes manufacturing tolerances into account better and therefore leads to higher accuracy, in particular when a standard CM is used for the measurement value correction. It is particularly preferred if a multiplicity of static difference values along the movement axis of the portal is determined and provided, since a standard CM can then work position-dependently in a manner known per se and interpolation values may optionally be used.

In another configuration, the static difference value is determined by a calibration run without measurement value corrections.

In other words, the calibration run is carried out in this configuration after an existing measurement correction (standard CM) has been switch off. The difference value recorded with such a calibration run thus directly corresponds to the static difference value in terms of the present invention. The recording and processing of the static difference value is simpler and faster with this configuration.

In another configuration, the measurement point is approached by means of at least two drives, with a first drive moving the first support and a second drive moving the second support, but the calibration run is carried out with only one of the drives.

The effect achieved by this configuration is that the static difference value is recorded substantially without constraint. Deformations and resulting irreproducible measurement errors can be better avoided. The correction according to the invention therefore leads to even more accurate results.

In another configuration, the first and second displacement positions are determined by means of temperature-corrected measuring instruments.

In other words, the inventive determination of the space coordinate is carried out by using the dynamic difference value only after the position values delivered by the measuring instruments have been corrected with respect to temperature-dependent deviations. Preferably, the position values of each measuring instrument are determined individually by using the current measurement temperatures. This configuration allows even higher accuracy.

In another configuration, the measurement point is approached by means of at least two drives, a first drive moving the first support, a second drive moving the second support and the two drives being actuated by a common regulator which receives the dynamic difference value as an input quantity.

In this configuration, the dynamic difference value is not only used for correcting the position values obtained, rather it is also used to control two separately driven supports with high synchronicity. The effect of this is that dynamic measurement errors are kept very small, and consequently the accuracy is also increased when determining the space coordinate of the measurement point. The configuration is furthermore advantageous because such regulation avoids work by the drives against the guides of the portal feet. The wear is consequently reduced in this configuration.

In another configuration, the first and second drives are switched off when the dynamic difference value exceeds a defined threshold value.

This configuration protects a new coordinate measuring machine comprising two separate drives against increased wear, since a high dynamic difference value indicates a lack of synchronism of the drives and a resulting stress on the drives.

In another configuration, the common regulator comprises a common position regulator and a synchronous regulator, which is subordinated to the position regulator, with the dynamic difference value being supplied to the synchronous regulator as an input quantity.

In this configuration, the common regulator is designed in two stages, only the second stage, i.e. the synchronous regulator, receiving the dynamic difference value as an input quantity. The synchronous regulator is therefore responsible for achieving synchronicity of the two drives, while the upstream position regulator controls the basic positioning of the portal feet. This configuration can be implemented simply and with less outlay (more cost-effectively) than a separate position regulator for each drive.

In a particularly preferred configuration, the synchronous regulator controls the two drives as a function of the dynamic difference value and as a function of a common setpoint specification of the position regulator.

In other words, the synchronous regulator in this case divides the setpoint specifications of the position regulator between the two drives, and it takes the dynamic difference value into account in order to move the driven supports as synchronously as possible into the specified position. The common position regulator controls the drives so to speak along a fictitious midline between the actual movement axes of the drives. This configuration is particularly simple and cost-effective since, in spite of the dual-drive operation, it is possible to use a simple position regulator which can be parameterized very rapidly onto the fictitious mid-axis.

In another configuration, a drive current for the first and second drives is limited to a defined maximum value, the defined maximum value preferably being equal to the current value needed for an acceleration of the supports.

This configuration ensures that the new coordinate measuring machine is not damaged even in the event of total failure of the common regulator. Indirectly, therefore, the high accuracy of the new coordinate measuring machine is also ensured.

In another configuration, the common regulator controls the first and second drives so that a drive current of approximately the same level results in both drives.

The two drives are advantageously actuated in this way when setting up the new coordinate measuring machine. This configuration avoids work by the drives against the linear guides of the supports even in cases when, for example, the zero point of one of the measuring instruments is displaced owing to temperature effects. Without the preferred configuration, in such a case, the common regulator would constantly attempt to compensate for the apparent position difference of the two supports. But since in the assumed case the supports do not lie as far apart from one another as would be indicated because of the measuring scale offset, the common regulator would permanently work against the guides of the supports. The wear caused by this and the deformations of the guides are avoided by this configuration. This configuration is particularly advantageous when aligning the coordinate measuring machine and when carrying out the calibration runs, since unconstrained movement of the probe head is more reproducible and therefore delivers more readily correctable measurement results.

It is to be understood that the features mentioned above and those yet to be explained below may be used not only in the respectively indicated combination, but also in other combinations or individually, without departing from the scope of the present invention.

BRIEF DESCRIPTION OF THE DRAWINGS

Exemplary embodiments of the invention are represented in the drawing and will be explained in more detail in the following description. In the drawing.

DESCRIPTION OF PREFERRED EMBODIMENTS

Figure 1:
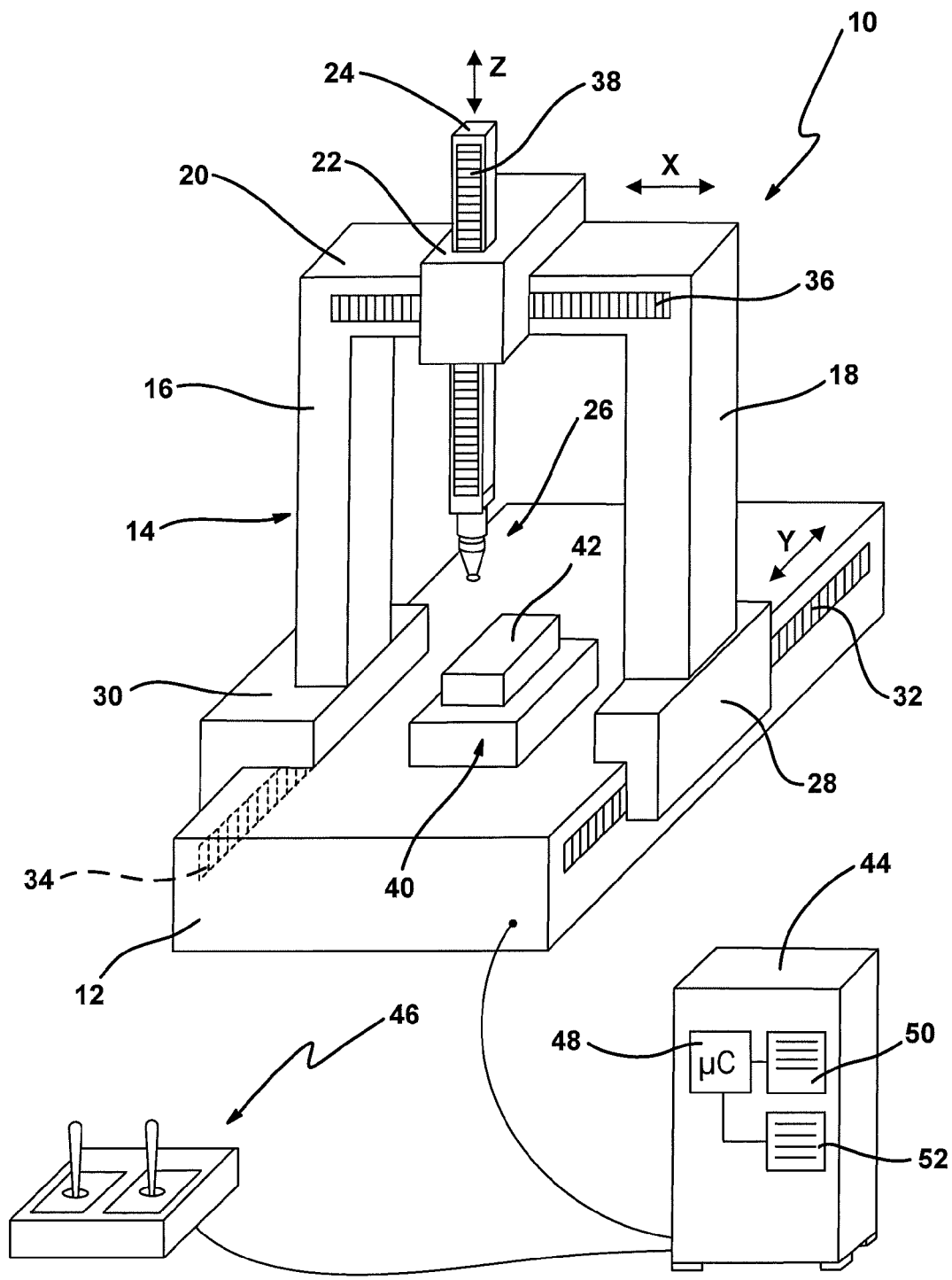
FIG. 1 shows a simplified representation of a preferred embodiment of the new coordinate measuring machine.

In FIG. 1, an exemplary embodiment of the new coordinate measuring machine is denoted overall by reference numeral 10.

The coordinate measuring machine 10 has a base 12, on which a portal 14 is arranged so that it can be displaced in the longitudinal direction (Y direction). The portal 14 has two portal feet (more generally: supports) 16, 18, which are connected by a bridge 20 at their respective other ends. A carriage 22, which can be displaced along the bridge, i.e. in a space direction (X direction) connecting the two portal feet 16, 18, is placed on the bridge 20. A ram 24, which can be displaced in a third space direction (Z direction) perpendicular to the first and second space directions, is arranged on the carriage 22. The three space directions X, Y and Z are preferably orthogonal to one another, although this is not absolutely necessary for the present invention.

A probe head 26, on which a stylus (not referred to in further detail) is arranged, is fastened on the lower free end of the ram 24. The stylus is used in a manner known per se for touching an object to be measured. The present invention is not restricted to a tactile coordinate measuring machine, however, and may likewise be used for coordinate measuring machines in which a measurement point is approached in a non-contact manner, i.e. for example a coordinate measuring machine with an optical scanning head. Furthermore, the invention is not restricted to a coordinate measuring machine in the portal design as shown here. It may equally (and preferably) be used for coordinate measuring machines in gantry design, in which only the bridge 20 with two supports can travel along two highly placed fixed rails. Moreover, the invention may generally be used for all coordinate measuring machines in which a displacement of the probe head in at least one movement direction is recorded by means of two mutually separated measuring instruments.

In this embodiment, the portal feet 16, 18 respectively have their own drive 28, 30 which allows movement of the portal in the Y direction. As an alternative to this, however, the invention may also be used when only one of the portal feet (one support) is driven and the second portal foot follows idly.

Two measuring scales 32, 34, which extend parallel to the Y direction, are schematically represented on the long sides of the base 12. In preferred embodiments, these are glass measuring scales with which the Y direction of the portal feet 16, 18 can be determined separately from one another. The measuring scales 32, 34 are therefore part of two measuring instruments for the Y position of the probe head 26. It is to be understood that these measuring instruments may furthermore contain suitable sensors for reading the measuring scales 32, 34, although these are not represented here for the sake of simplicity. It should furthermore be pointed out that the invention is not restricted to the use of glass measuring scales, and may be used with other measuring instruments for recording the Y position of the probe head.

Another measuring scale 36 is arranged parallel to the X direction on the bridge 20. Finally, another measuring scale 38 is also arranged parallel to the Z direction on the ram 24. By means of the measuring scales 36, 38, it is possible to record the present X position and Z position of the probe head 26 metrologically in a manner which is known per se.

Reference numeral 40 denotes an object to be measured, on which the space coordinates of the measurement point 42 are intended to be determined.

Reference numeral 44 denotes a control and evaluation unit, which is designed to actuate the drives of the coordinate measuring machine 10 so that the probe head 26 travels to the measurement point 42. For manual operation, the control unit 44 may be connected to a user console 46. It is also possible for the control unit 44 to fully automatically approach and measure measurement points 42 of the object 40 to be measured.

The control unit 44 contains a processor 48 and a plurality of memories, which are represented here by the reference numerals 50 and 52 for the sake of simplicity. A computer program, by means of which the method explained below can be carried out, is stored in the memory 50. Static difference values, which according to one exemplary embodiment of the new method have been determined in a calibration run, are permanently stored in the memory 52.

Figure 2:
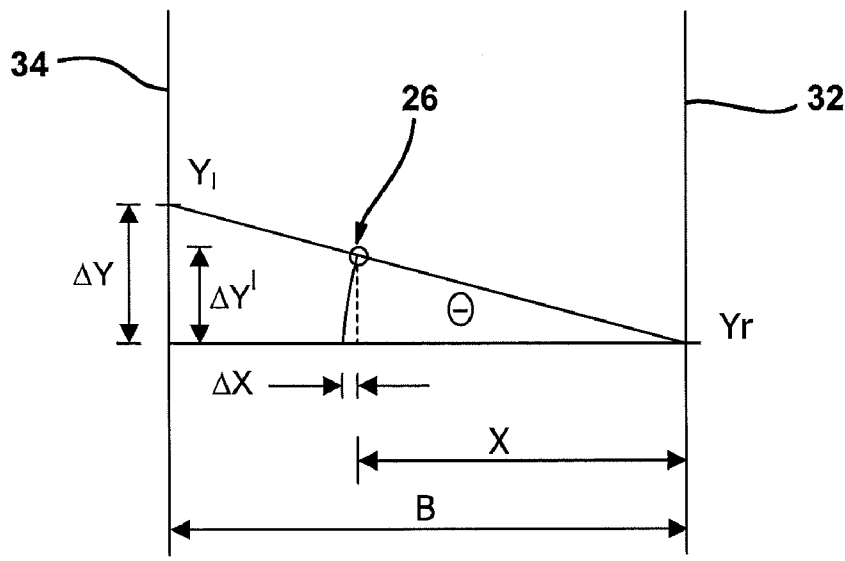
FIG. 2 shows a schematic representation to explain measurement errors which are caused by an unequal forward increment of the portal feet of a coordinate measuring machine of the type shown in FIG. 1.

FIG. 2 shows a simplified geometrical representation with the two measuring scales 32, 34 for determining the Y position of the probe head 26. It is to be assumed in this case that the probe head 26 lies at the position denoted by a circle. This position results from a displacement of the probe head 26 in the X direction by the amount X, measured from the right-hand outer end of the measuring scale 36, and a displacement of the probe head 26 in the Y direction to the setpoint position $Y_r$. For various reasons, for example a lack of synchronicity of the drives 28, 30 or because of oscillations of the portal 14, however, the measurement positions $Y_l$ and $Y_r$ are separated from each other by the actual difference ΔY. The true offset of the probe head 26 from the measuring scale 32 used as a reference here is then ΔY', and it is dependent on the respective X position of the probe head 26 as can be seen from the representation in FIG. 2.

Owing to the rotation due to the unequal Y positions on the two measuring scales 32, 34, the probe head 26 also experiences a deviation in the X direction, which is denoted as ΔX here.

The correction value ΔY' for the Y position is obtained by the known geometrical ray law as $$\Delta Y' = \Delta Y \cdot \frac{X \pm L_x}{B} = (X \pm L_x) \cdot \tan\theta,$$

where B is the distance between the two measuring scales 32, 34 and $L_x$ is the length of the stylus (not represented here) in the X direction.

The correction value ΔX is obtained as $$\Delta X = L_Y \cdot \tan\theta\theta$$

where $L_Y$ is the length of the stylus (not represented here) in the Y direction.

The deviations represented in FIG. 2 contain a reproducible error component, in particular statistical and possibly elastic guide errors, as well as an irreproducible component which varies with each measurement value recording. The reproducible component will be approximated below by the static difference value, and the irreproducible component by the dynamic difference value.

Figure 3:
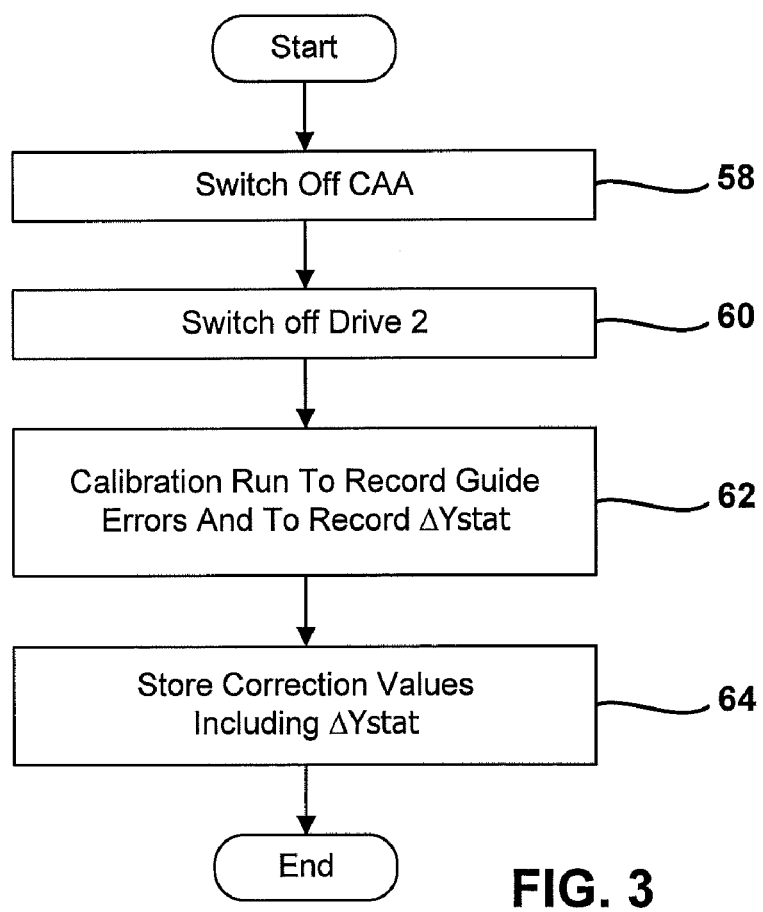
FIG. 3 shows a simplified flow chart which shows the provision of the static difference value.

FIG. 3 shows an embodiment of the way in which a static difference value ΔYstat can be determined. To this end, according to step 58, the computerized error correction (CAA) conventionally provided in coordinate measuring machines is first switched off. According to step 60, the second drive for the portal 14 is also switched off, i.e. for example the drive 30, or the calibration run is carried out before connecting up the second drive 30. In other words, the portal 14 is advantageously moved by only one of the drives 28, 30 in order to record the static difference value ΔYstat.

According to step 62, a calibration run is subsequently carried out along the Y direction, while measurement values for future correction of guide errors are recorded at defined support points. At least one static difference value ΔYstat, which corresponds for the calibration run to the difference value ΔY' in FIG. 2 for a particular position of the probe head 26, is also determined. Static difference values ΔYstat are preferably recorded for a multiplicity of probe head positions 26, in order to adapt the correction of the position values to the respective probe head position 26.

Finally, in step 64, all the correction values including the static difference value or values ΔYstat are stored in the memory 52 of the coordinate measuring machine 10.

Figure 4:
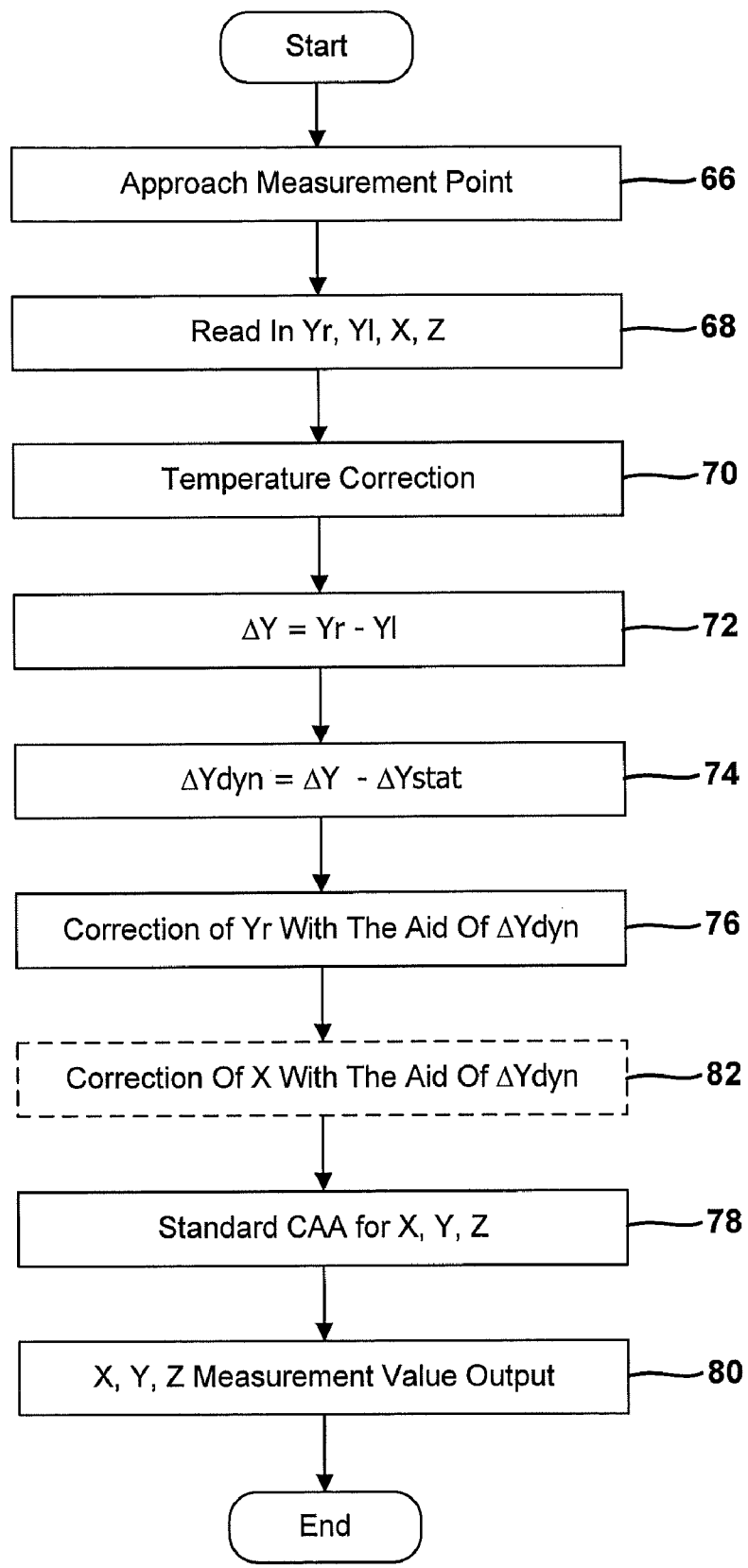
FIG. 4 shows a simplified flow chart to explain an embodiment of the method according to the invention.

FIG. 4 shows an embodiment of the way in which the space coordinates can be determined. According to step 66, the measurement point 42 is approached by the probe head 26. After the measurement point 42 is reached, the space coordinates of the probe head 26 are read in by means of the measuring scales 32, 34, 36, 38. Coordinate values $Y_r$, $Y_l$, X and Z are thereby obtained. (For the sake of simplicity, deflections of the stylus when sampling the measurement point 42 are not considered here. It is nevertheless to be understood that such deflections may be taken into account in a manner known per se for determining the space coordinate, when the measurement is carried out by a corresponding stylus.)

According to step 80 temperature compensation is subsequently carried out, i.e. a correction of the recorded measurement values $Y_r$, $Y_l$, X and Z by means of the respective ambient temperatures and the thermal expansion coefficients of the measuring scales 32 to 38. The correction of the measurement values is preferably carried out as a function of the temperature of each individual measuring scale 32 to 38.

In the next step 72, the actual difference ΔY between the (temperature-corrected) Y position measurement values $Y_l$, $Y_r$ is determined. According to step 74, a dynamic difference value ΔYdyn is then determined by subtracting the stored static difference value ΔYstat from the actual difference ΔY.

In the next step 76, the Y position of the probe head 26 is determined using the dynamic difference value ΔYdyn by correcting the value $Y_r$ delivered by the measuring scale 32 with the dynamic difference value ΔYdyn (addition or subtraction, depending on the direction of the deviation).

Subsequently according to step 78, a standard correction known per se is carried out for all the recorded measurement values X, Y, Z by using the correction values recorded in the calibration run. In this case, however, the Y position of the probe head 26 already corrected by the dynamic difference value is used as a starting point for the Y position of the probe head 26. In a preferred exemplary embodiment, the standard correction is carried out by means of the LASERCAL program which is available from the Assignee of the present invention for this purpose. Finally, the corrected position values X, Y, Z are output in step 80.

In a preferred variant of this embodiment, the X position of the probe head 26 is also determined by using the dynamic difference value or the dynamic correction value ΔX derived therefrom, before carrying out the standard correction in step 78.

The method described above for determining the space coordinates of the measurement point 42 may basically be carried out with coordinate measuring machines having only one drive for the portal 14, but more particularly with coordinate measuring machines having two separate drives for the portal feet 16, 18. In the latter case, the dynamic difference value is advantageously also used in order to control the two portal feet 16, 18 as synchronously as possible. As an alternative to this, such control of the drive may even be carried out without the measurement value correction described above.

Figure 5:
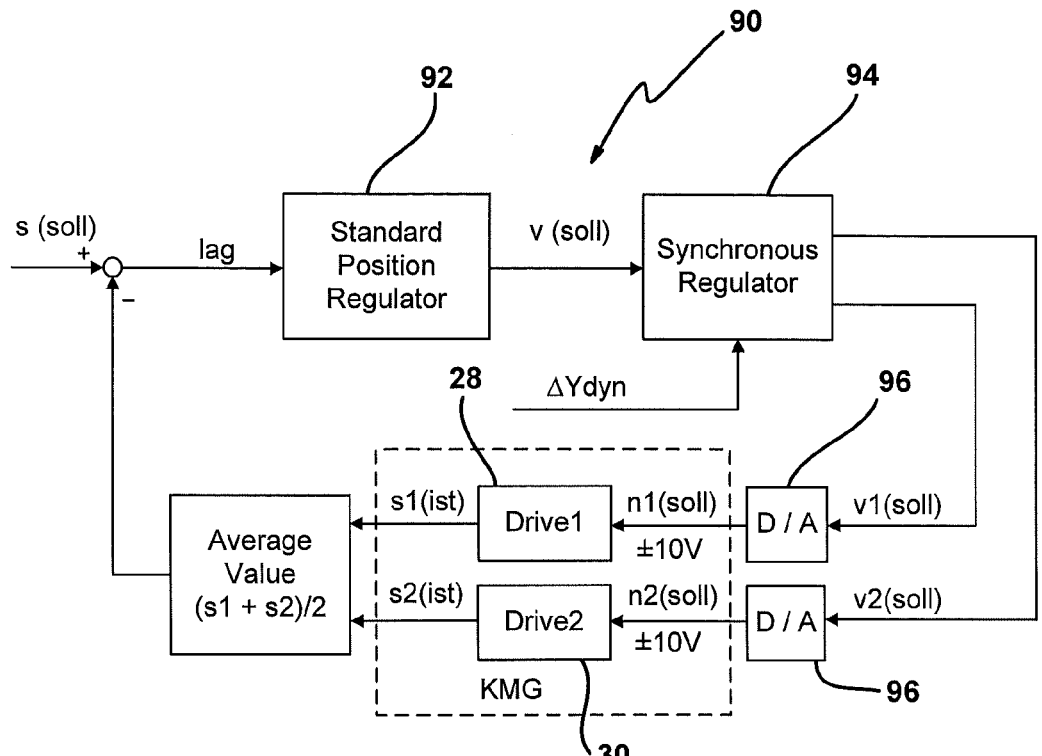
FIG. 5 shows a functional block diagram of a preferred regulator for a coordinate measuring machine of the type shown in FIG. 1.

In a preferred embodiment, the position regulation is carried out by a two-stage common regulator 90, as is schematically represented in FIG. 5. The common regulator 90 contains a position regulator 92, downstream of which a synchronous regulator 94 is connected. The position regulator 92 is a standard position regulator for one movement axis, such as may also be used in a coordinate measuring machine having only one drive for the Y direction. Here, however, it regulates the position of the portal 14 not along the motion axis of one of the drives, but along a fictitious drive axis which lies centrally between the two movement axes of the drives 28, 30. The respective position value is therefore provided as an average value of the positions s1 and s2 on the two axes. The position setpoint value $s_{(soll)}$ comes in a manner known per se from the control unit 44 of the coordinate measuring machine 10.

As a function of the difference between the setpoint position $s_{(soll)}$ and the (averaged) actual position $s_{(ist)}$, the position regulator 92 generates a specification value for the velocity of the two drives 28, 30. The specification value $v_{(soll)}$ is supplied to the synchronous regulator 94. The synchronous regulator 94 also receives the dynamic difference value ΔYdyn. From these two quantities, the synchronous regulator 94 generates two velocity specification signals v1$_{(soll)}$ and v2$_{(soll)}$, which are respectively supplied via a digital-analog converter 96 to the two drives 28, 30. The drives 28, 30 therefore receive a setpoint specification for the rotary speed and set a corresponding rotary speed. This leads in the known way to a positional displacement of the portal feet 16, 18, which is subsequently recorded via the measuring scales 32, 34. From the measurement values obtained, on the one hand the dynamic difference value ΔYdyn is calculated and optionally used for correcting the measurement values obtained (cf. FIG. 4 above). The average actual position value is furthermore determined and supplied as a fictitious actual position value to the standard position regulator 92.

Figure 6:
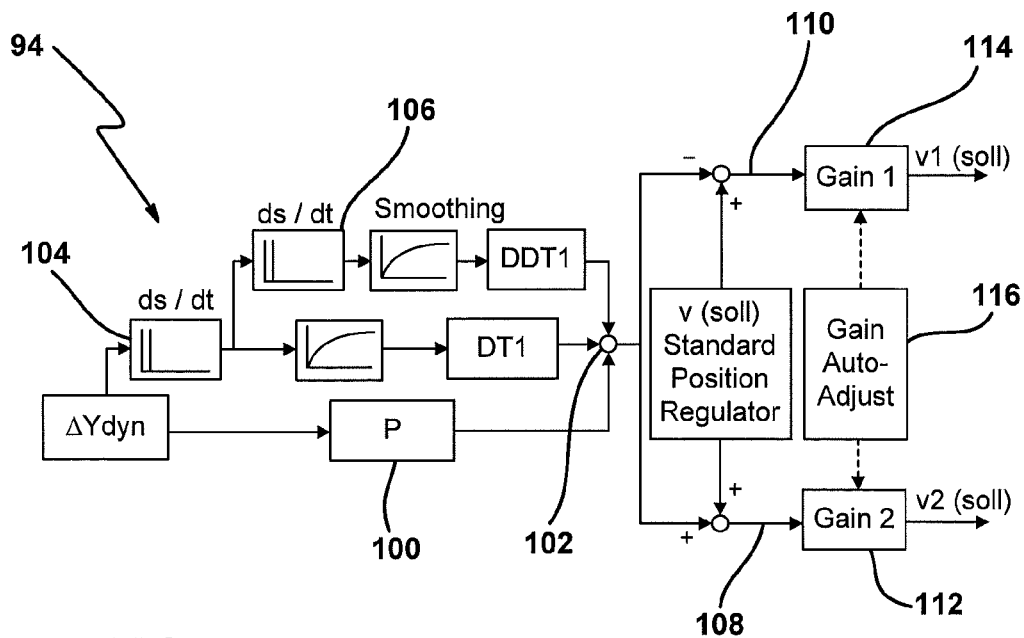
FIG. 6 shows a functional block diagram for a synchronous regulator, which may be employed in the regulator of FIG. 5.

FIG. 6 shows a preferred embodiment of the structure of the synchronous regulator 94. The synchronous regulator 94 receives the dynamic difference value ΔYdyn as an input quantity. It supplies the dynamic difference value ΔYdyn in a first branch via a proportional element 100 to a summation point 102. In a second branch, the synchronous regulator 94 differentiates the received dynamic difference value ΔYdyn by means of a differentiator element 104 and it supplies the differentiated output value likewise to the summation point 102. In a third branch, the differentiated value is differentiated a second time (differentiator element 106) and supplied to the summation point 102. At the summation point 102, a control value is therefore obtained which comprises both a proportional component and a differential component differentiated one and twice with respect to time. The components may be weighted using factors P, DT1 and DDT1. Furthermore, the output values of the differentiation components 104, 106 may also be smoothed via a smoothing element. Increasing the P component leads to smaller dynamic difference values, but to an increasing oscillation susceptibility. The oscillation susceptibility of the synchronous regulator can be reduced by means of the factors DT1 and DDT1.

The control variable obtained at the summation point 102 is additively superimposed on the velocity setpoint specification of the standard position regulator 92 in a first branch 108. In a second branch 110, the control variable from the summation point 102 is subtractively superimposed on the velocity specification value of the standard regulator 92. The control variables obtained in this way are respectively supplied to an output stage 112, 114, which generates the velocity specification values for the two drives 28, 30. In order to compensate for different gain factors of the output stages 112, 114, in one embodiment automatic matching 116 is provided. In this case, the regulator integrates a dynamic difference occurring in a high constant velocity run over the gain factors. The dynamic difference value therefore becomes equal to zero on average.

In another embodiment, the regulator may manage different gain factors for positive and negative runs. In this way, different values can be compensated for as a function of the movement direction of the portal 14.

Figure 7:
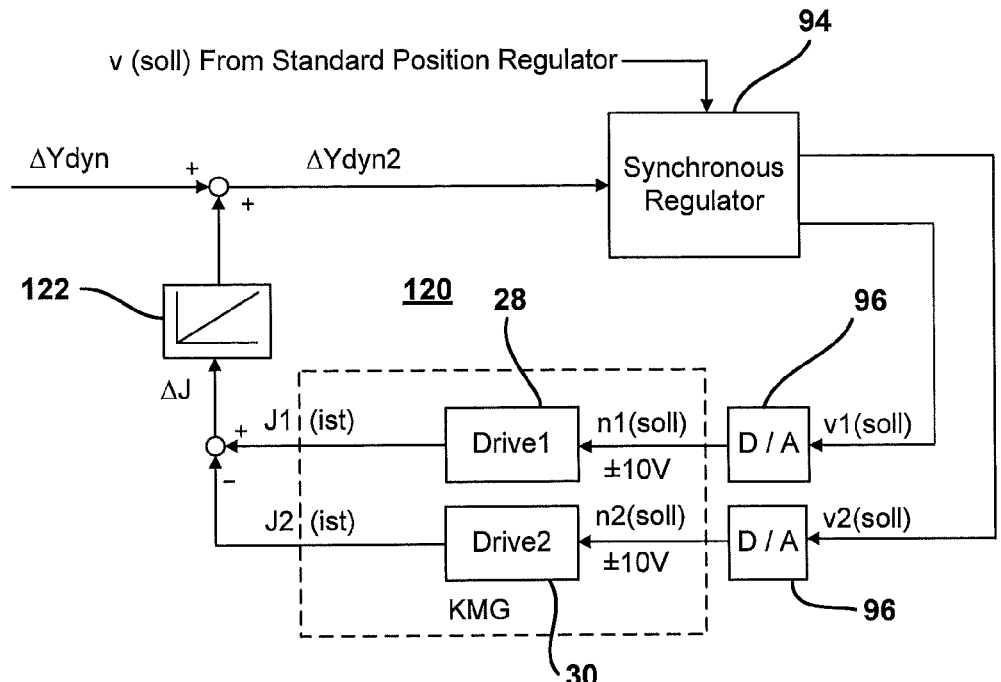
FIG. 7 shows an extension of the regulator shown in FIG. 5, in order to achieve high synchronicity even in long-term operation.

FIG. 7 shows an advantageous extension of the common regulator 90 in FIG. 5. The extension contains a further control loop 120 which does not, however, replace the control loop shown in FIG. 5 but supplements it. The further control loop 120 measures the drive currents I1$_{(ist)}$ and I2$_{(ist)}$ of the two drives 28, 30 and forms a difference current ΔI therefrom. The difference current ΔI is integrated via an integrator 122, and the value obtained is added to the dynamic difference value ΔYdyn. A corrected dynamic difference value ΔYdyn2 is thereby obtained, which is supplied to the synchronous regulator 94 instead of the uncorrected dynamic difference value ΔYdyn. In other regards, the synchronous regulator 94 operates as explained by means of FIG. 6.

The advantage of the regulator 90 extended according to FIG. 7 becomes noticeable when, in the course of time, the measuring instruments of the coordinate measuring machine 10 experience changes which lead to a (further) static difference value. Without the extension according to FIG. 7, the common regulator 90 would constantly attempt to compensate for such a further difference value component, which, however, would stress the guides of the coordinate measuring machine 10. By using the corrected dynamic difference value ΔYdyn2, this undesired result can be avoided. The integrator 122 ensures that a drive current of approximately equal level is set up in both drives. In other words, the effect of the control loop 120 is that the difference current ΔI becomes zero on average.

It is particularly advantageous for the corrected dynamic difference value ΔYdyn2 to be used in method step 74 according to FIG. 4 for correcting the recorded position values. In this way, even higher accuracy can be achieved for determining the space coordinate.

It is particularly advantageous for the integrator 122 to have an adjustable gain K$_I$, so that the velocity of the control loop 120 can be varied. With a high integration gain K$_I$, the coordinate measuring machine 10 can automatically be adjusted to an unconstrained movement profile when setting up, by moving the portal 14 a few times to and fro directly after the calibration run. The corrected dynamic difference value ΔYdyn2 is thereby adapted automatically to a value which allows unconstrained movement of the two portal feet 16, 18. For the actual measurement operation, the integration gain K$_I$ is reduced or even switched off so that essentially or only the integrated difference current is used for correcting the dynamic difference value. In this way, slow adaptation takes place to corresponding variations of the coordinate measuring machine 10.

Figure 8:
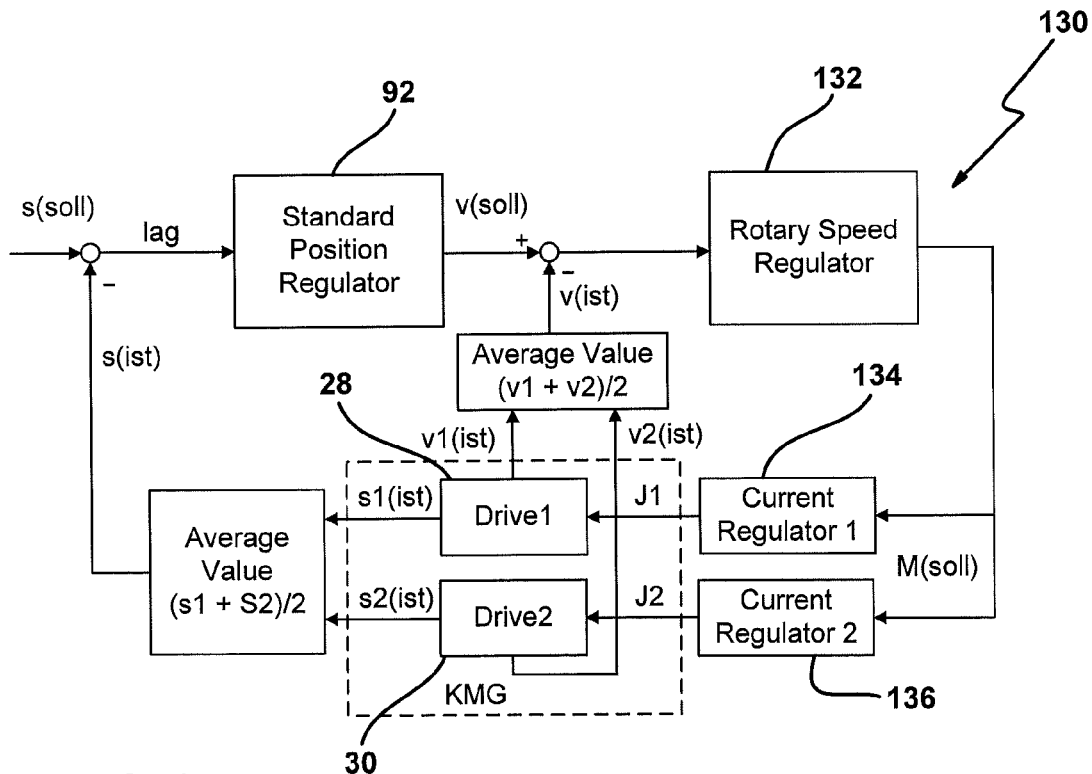
FIG. 8 shows another preferred exemplary embodiment of the common regulator.

FIG. 8 shows another preferred embodiment of a common regulator 130. Reference numerals which are the same refer to the same elements as before.

The regulator 130 likewise contains a standard position regulator 92, which receives a position setpoint value s$_{(soll)}$ from the control unit 44 of the coordinate measuring machine 10. It also receives a actual position value s$_{(ist)}$ as an average of the positions s1 and s2 of the two portal feet 16 and 18. From this, the standard position regulator 92 generates a specification value v$_{(soll)}$ which, however, is now supplied to a rotary speed regulator 132. The specification value v$_{(soll)}$ specifies a setpoint velocity of the two drives 28, 30, which the standard position regulator calculates from the position specification. The rotary speed regulator 132 receives the velocity setpoint value not directly, however, but reduced by the average actual velocity v$_{(ist)}$ which is given by the average value of the velocities v1 and v2 of the two drives 28, 30. The rotary speed regulator 132 generates a torque setpoint value M$_{(soll)}$ therefrom, which is supplied to two separate current regulators 134, 136. The current regulators 134, 136 form the drive currents for the two drives 28, 30 therefrom. Owing to this arrangement, the same forward increment force is always obtained for the two drives 28, 30. Constraint forces cannot in principle occur in this case, if the two portal feet 16, 18 are coupled together rigidly enough.

The common rotary speed regulator 132 may be constructed in either digital or analog form. In the case of a digital rotary speed regulator, the average actual velocity is obtained from the differentiated position signals s1 and s2 of the drives 28, 30. In the case of an analog rotary speed regulator, the respective tacho signals are averaged in analog fashion.

What is claimed is:

1. A method for determining at least one space coordinate of a measurement point on a measurement object using a coordinate measuring machine ("CMM") having a probe head arranged on a displacement mechanism comprising first and second movable supports for controlling movement of the probe head along at least a first axis, comprising the steps of:
conducting a calibration run of the CMM and obtaining measurement values of the displacement position of each of said first and second movable supports at a plurality of defined positions of said probe head,
storing in a memory a plurality of static difference values determined in accordance with the difference in the respective measurement values for said first and second movable supports at each of said plurality of defined positions,
subsequently conducting a measurement run of the CMM by approaching the measuring point with the probe head,
determining a first displacement position of the first movable support and determining a second displacement position of the second movable support,
determining an actual difference value between the first and the second displacement positions,
determining from the static difference values stored in said memory a static difference value which represents a static difference between the first and the second displacement positions,
subtracting the static difference value from the actual difference in order to obtain a dynamic difference value,
correcting the first displacement position using the dynamic difference value in order to obtain a pre-corrected displacement position, and
subsequently correcting the pre-corrected displacement position by using the static difference value,
thereby determining the space coordinate of the measurement point.

2. The method of claim 1, wherein said first and second movable supports are moved substantially parallel along said first axis when approaching the measurement point, and wherein the probe head is moved along a second axis transverse to said first axis when approaching the measurement point, wherein the space coordinate is determined along both said first axis and said second axis by using the dynamic difference value.

3. The method of claim 1, wherein the plurality of static difference values determined by means of said calibration run are permanently stored in said memory.

4. The method of claim 1, wherein the plurality of static difference values determined by said calibration run are determined without any measurement value corrections.

5. The method of claim 1, wherein the measurement point is approached by means of at least two drives, a first drive moving the first movable support and a second drive moving the second movable support, and further wherein the calibration run is carried out with only one of the drives.

6. The method of claim 1, wherein the first and the second displacement positions are determined by means of separate first and second temperature-corrected measuring instruments.

7. The method of claim 1, wherein the measurement point is approached by means of at least two drives, a first drive moving the first movable support, a second drive moving the second movable support, and the two drives being actuated by a common regulator which receives the dynamic difference value as an input quantity.

8. The method of claim 7, wherein the first and second drives are switched off when the dynamic difference value exceeds a predefined threshold value.

9. The method of claim 7, wherein the common regulator comprises a position regulator and a synchronous regulator, which is subordinated to the position regulator, the dynamic difference value being supplied to the synchronous regulator as an input quantity.

10. The method of claim 7, wherein a drive current for the first and second drives is limited to a predefined maximum value.

11. The method of claim 10, wherein the predefined maximum value is approximately equal to the current value required for an acceleration of the first and second movable supports.

12. The method of claim 7, wherein the common regulator controls the first and second movable drives so that drive currents of approximately the same level result in both drives.

13. A coordinate measuring machine for determining during a measurement run at least one space coordinate of a measurement point on a measurement object, comprising
a displacement mechanism having a first and a second movable support,
a probe head arranged on the displacement mechanism for approaching the measuring point,
a first and a second measuring instrument for determining a first displacement position of the first movable support and a second displacement position of the second movable support, respectively,
an actual difference formation unit for determining an actual difference value between the first and second displacement positions,
a memory for permanently storing and providing a static difference value representing a static difference between the first and second displacement positions, said static difference value being determined by means of a previously conducted calibration run and then stored in the memory, and
a calculation unit for determining the space coordinate of the measurement point, the calculation unit comprising a subtractor for subtracting the static difference value from the actual difference value in order to obtain a dynamic difference value, and further configured to correct the first displacement position using the dynamic difference value in order to obtain a pre-corrected displacement position, and subsequently correct the pre-corrected displacement position by using the static difference value, thereby determining the space coordinate of the measurement point.

14. A computer program product comprising program code configured for carrying out a method, when executed on a processor of a coordinate measuring machine, comprising the following steps:
approaching the measuring point with a probe head arranged on a displacement mechanism which comprises a first and a second movable support,
determining a first displacement position of the first support and determining a second displacement position of the second support,
determining an actual difference value between the first and the second displacement positions,
receiving a static difference value which represents a static difference between the first and the second displacement positions, said static difference value being determined by means of a previously conducted calibration run and then stored in a memory, subtracting the static difference value from the actual difference value in order to obtain a dynamic difference value, correcting the first displacement position using the dynamic difference value in order to obtain a pre-corrected displacement position, and subsequently correcting the pre-corrected displacement position by using the static difference value, thereby determining the space coordinate of the measurement point.

15. A method for determining at least one space coordinate of a measurement point on a measurement object, comprising the steps of:

approaching the measuring point with a probe head arranged on a displacement mechanism which comprises a first and a second movable support, determining a first displacement position of the first support and determining a second displacement position of the second support, determining an actual difference value between the first and the second displacement positions, providing a static difference value which represents a static difference between the first and the second displacement positions, subtracting the static difference value from the actual difference value in order to obtain a dynamic difference value, and determining the space coordinate of the measurement point as a function of the dynamic difference value and the static difference value, wherein the measurement point is approached by means of at least two drives, a first drive moving the first support, and a second drive mechanically independent of said first drive for moving the second support, and further wherein the first and second drives are actuated by a common electronic regulator which receives the dynamic difference value as an input quantity.

* * * * *